H. Y. McINTYRE.
APPARATUS FOR PURIFYING WATER.
APPLICATION FILED AUG. 13, 1915.
1,207,309.
Patented Dec. 5, 1916.
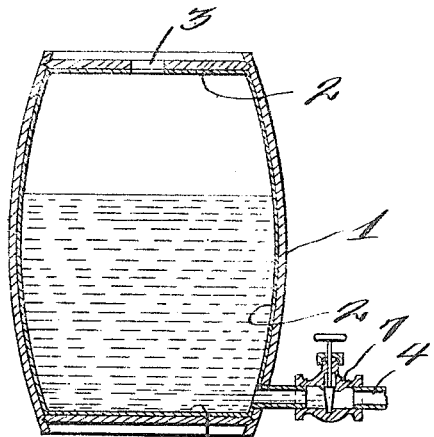
Fig. 2.
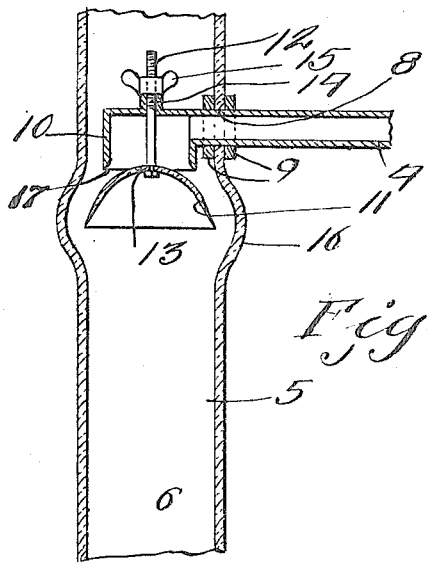
Fig. 1.
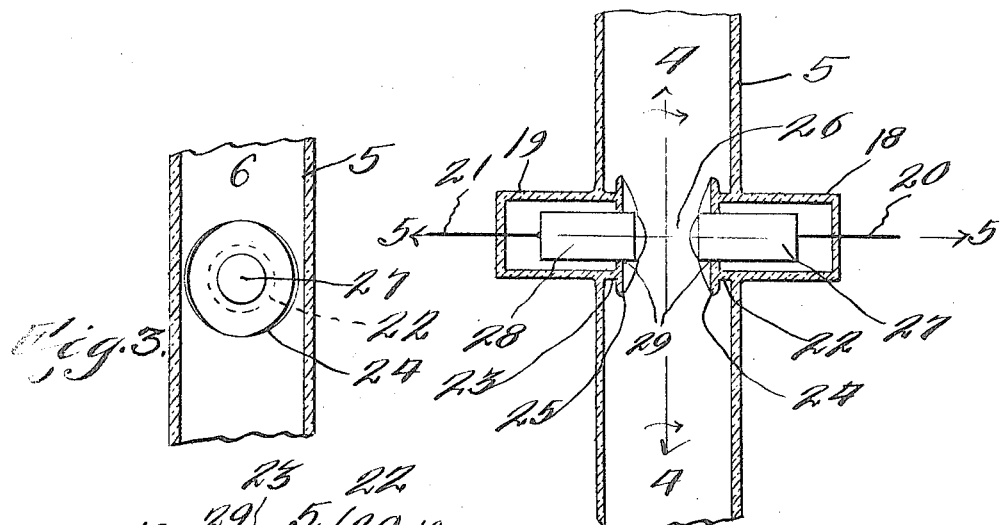
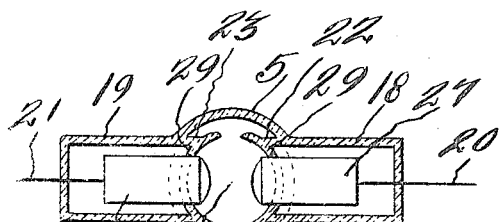
Fig. 4.
Witnesses
Inventor
H. Y. McIntyre
By D. Swift & Co.
Attorneys

UNITED STATES PATENT OFFICE.

HUGH YOUNGS McINTYRE, OF MILWAUKEE, WISCONSIN.

APPARATUS FOR PURIFYING WATER.

1,207,309.

Specification of Letters Patent.

Patented Dec. 5, 1916.

Application filed August 13, 1915. Serial No. 45,360.

*To all whom it may concern:*

Be it known that I, HUGH YOUNGS MCINTYRE, a citizen of the United States, residing at Milwaukee, in the county of Milwaukee and State of Wisconsin, have invented a new and useful Apparatus for Purifying Water; and I do hereby declare the following to be a full, clear, and exact description of the invention, such as will enable others skilled in the art to which it appertains to make and use the same.

This invention relates to an improved apparatus or plant for the treatment or purification of fluid, and an object of the invention is to provide means for causing the fluid to run or flow in a uniform thin sheet, whereby the same may become impregnated with the silent discharges or gases or other emanations, for purifying the fluid.

Another object of the invention is to provide means for varying the thickness of the sheet of fluid. In other words, it has been found that the thinner the fluid may run, more easily will it become impregnated with such discharges or gases from electricity, thereby more thoroughly purifying the fluid.

Another object of the invention is to provide means whereby the requisite silent discharges, gases, or other emanations may be produced for pregnating the thin sheet of fluid.

A further object of the invention is to provide means through which the fluid after having been purified by such gases or ozone may pass for cleansing the fluid, thereby making the same ready for use, and when such is the case, the fluid may be drawn off into a sterilized receptacle.

In practical fields the details of construction may necessitate alterations, falling within the scope of what is claimed.

The invention comprises further features and combination of parts, as hereinafter set forth, shown in the drawings and claimed.

In the drawings:—Figure 1 is an enlarged detail sectional view through a glass tubular member, showing the means whereby the sheet of fluid may be regulated or governed in its thickness uniformly, and showing the electrical terminals, whereby the electrical sparks are created. Fig. 2 is a sectional view through a copper lined receptacle for the fluid or water. Fig. 3 is a sectional view on line 4—4 of Fig. 1. Fig. 4 is a sectional view transversely of Fig. 1 on line 5—5.

Referring more especially to the drawings, 1 designates a fluid container, which is provided with a copper lining 2, there being an opening 3 in its top, so that the water or fluid may be passed into the receptacle. Connected to the receptacle 1 or container is a copper pipe or conduit 4, for conveying the fluid or water to a glass tube 5 having an ozone chamber 6, there being a suitable valve 7, for controlling the fluid or water in its flow through the copper pipe or conduit. This conduit or pipe 4 passes through an opening 8 of the glass tube, there being suitable nuts 9 for holding the tube or conduit or pipe 4 in its proper position.

The end portion of the tube or conduit 4 terminates in an annular downwardly extending flange 10 on the interior of the tube 5. In other words, in the upper part of the ozone or gas chamber 6. Telescoping the flange 10 or wall suitably, as shown in Fig. 1 is a conical shaped or bell member 11, to which a stem or shank 12 is swiveled at 13, to the upper convexed wall thereof. This stem or shank 12 passes through the flanged opening 14 of the upper wall of the annular enlargement of the pipe or conduit 4, and to which stem or shank a winged nut or the like 15 is threaded, for raising and lowering the conical or bell member 11. The wall of the glass tube 5 adjacent the conical or bell member has a conical or tapered portion 16, so that when the fluid or water passing through the conduit or pipe 4 spreads in a uniform sheet on the conical or bell spreader 11, the fluid or water will shed from the conical shaped or bell member 11 in a thin sheet uniformly annularly on to the conical or tapering wall 16 of said glass tube, and will then uniformly flow down the cylindrical wall of the glass tube.

It will be observed that by adjusting the spreader or bell shaped member 11 upwardly so as to bring the conical or convexed outer surface of the bell member or spreader close to the peripheral edge 17 of the flange 10, the sheet of fluid or water is made thinner, that is, uniformly annularly. However, by lowering the spreader or bell shaped member 11 the sheet of fluid is thickened. When the sheet of fluid is very thin, it is found that the fluid may more easily become pregnated with the discharges or gases from the electrical sparks. By providing this adjusting means for the spreader or bell shaped member, the sheet of fluid may be governed or regulated, according to the consistency of the fluid which is being purified or treated. The glass tube 5 is provided with tubular extensions 18 and 19 extending laterally and in opposite directions, and being oppositely disposed, and having their outer ends closed, as shown in Fig. 1, with the exception of a small orifice, through which the wires or leads 20 and 21 extend. These extensions 18 and 19 have adjoining extensions 22 and 23 on the interior of the glass tube 5, which are provided with flanges 24 and 25, to prevent the sheet of fluid from contacting with the current of electricity as it sparks across the gap 26 between the zinc spark rods or terminals 27 and 28, which are mounted in the openings 29 of the inner end of the extensions 22 and 23. As the current of electricity from any suitable source, not shown, sparks across the gap 26 between said zinc spark rods or terminals 27 and 28 gas discharges are created from the spark, or emanates from the electrical spark, and owing to these gaseous discharges being lighter than air they pass upwardly through the ozone chamber 6 of the tube 5 and impregnate the thin sheet of water or fluid, which passes downwardly on the interior surface of the ozone chamber of said tube, thereby ozonating or purifying the fluid, which continues downwardly upon the interior of the wall of said glass tube, and through any suitable filterer, not shown, and then into any suitable storage container, not shown.

The invention having been set forth, what is claimed is—

1. In an ozonating or purifying device, a glass tubular member having tubular extensions extending laterally from said member at diametrically opposite points, sparking terminals arranged axially with each other with their inner ends spaced apart and mounted in said extensions and to be connected to an electric circuit for creating a spark across the gap between the two terminals, said tubular member having an ozone chamber, and means for causing a thin sheet of water to descend down the inner surface of said chamber to be ozonated or purified by the gaseous discharges from the electric spark across said gap.

2. In an ozonating or purifying device, the combination of a glass tubular member having an ozonating chamber and means for causing a sheet of water to descend down upon the inner surface of said chamber, of a pair of sparking electrode terminals axially arranged and mounted diametrically opposite each other in the wall of said member with their inner ends spaced apart, whereby the gaseous discharges from the spark across said gap will impregnate the sheet of water for ozonating or purifying the same, the inner surface of said chamber having diametrically opposite circular flanges surrounding the electrode terminals to prevent the sheet of water from contacting with the electrodes.

3. In an ozonating and purifying device, the combination of a glass tubular member having an ozonating chamber and means for causing a sheet of water to descend down upon the inner surface of said member, of a pair of diametric axially opposite extensions protruding outwardly from the member, inwardly protruding diametric opposite extensions axial with each other and with the first extension, said inward extensions having diametrically opposite disposed circular plates, which together with the inwardly protruding extensions prevents the sheet of water from contacting with electrode terminals, and a pair of electrode sparking terminals arranged axially and having their inner ends spaced apart and mounted in said circular plates, whereby the gaseous discharges generated from the spark across said gap will impregnate the sheet of water to ozonate or purify the same, said circular plates being larger in diameter than the inner protruding extensions, thereby forming flanges to guard the electrode terminal from the sheet of water.

4. In an ozonating or purifying device, the combination of a glass tubular member having an ozonating chamber and means in said chamber for ozonating or purifying a sheet of water, of means for causing a sheet of water to descend down the wall of said chamber, and means at diametrically opposite points of said chamber and adjoining said ozonating or purifying means to guard the same against contact by the sheet of water.

5. In an ozonating or purifying device, the combination of a glass tubular member having an ozonating chamber and means in said chamber for ozonating or purifying a sheet of water, of means for causing a sheet of water to descend down the wall of said chamber, said member having an outwardly extending annular bulge, said last named means comprising an inlet pipe terminating in a circular head in the upper part of said tubular member, said head having a downwardly extending annular flange, the lower inner edge portion of which is beveled, a hanger rod, a bell shaped fluid spreading member swiveled upon the lower end of said hanger, and means for adjusting the hanger, whereby the convexed surface of the spreader may be adjusted toward and from the inner beveled edge portion of the flange to increase or decrease the sheet of water to be directed toward the inner surface of the annular bulge by said spreader.

In testimony whereof I have signed n name to this specification in the presence two subscribing witnesses.

HUGH YOUNGS McINTYRE.

Witnesses:
F. M. LEWANDOWSKI,
STANLEY IMANSKI.